United States Patent Office 3,529,661
Patented Sept. 22, 1970

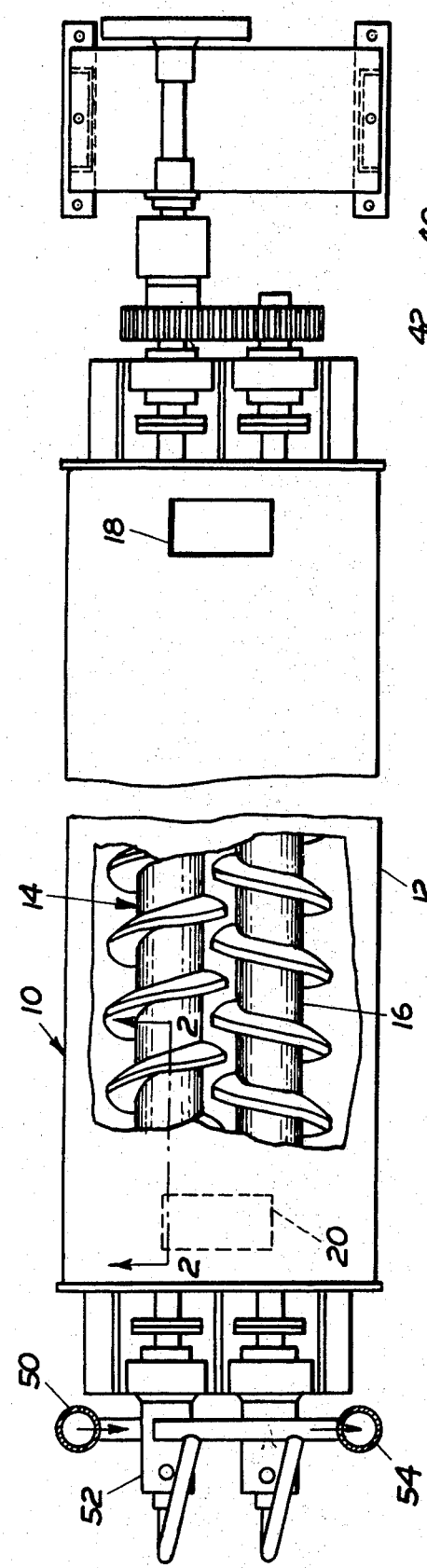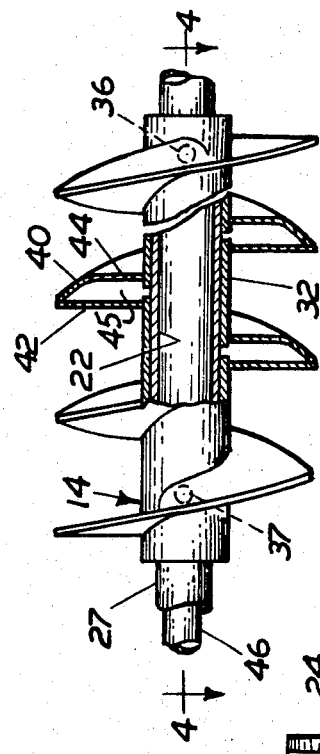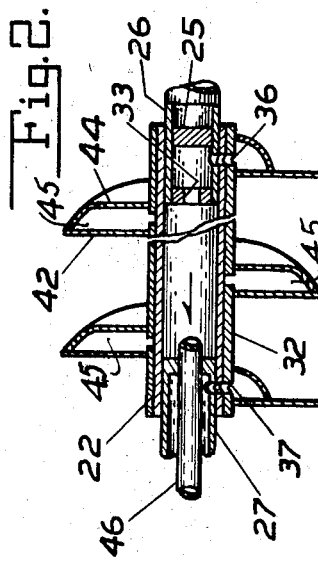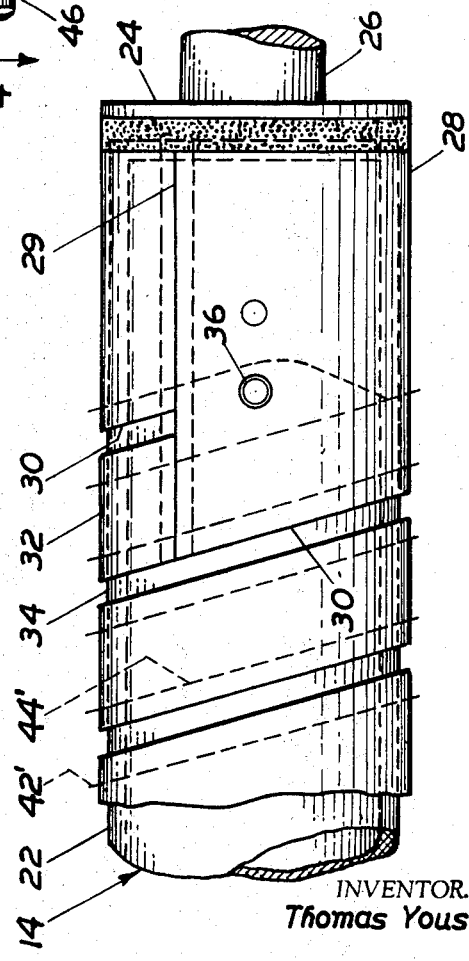

3,529,661
ROTARY MATERIAL PROCESSOR WITH HOLLOW MATERIAL CONTACTING ELEMENTS
Thomas Yousch, 16258 Vintage St.,
Granada Hills, Calif. 96038
Filed Apr. 29, 1968, Ser. No. 725,033
Int. Cl. F28f *5/06*
U.S. Cl. 165—87                    10 Claims

ABSTRACT OF THE DISCLOSURE

A rotary material processor having rotatable elements wherein each such element comprises an elongated stem tube, pad means mounted on the stem tube with end portions rigidly secured to said stem tube and intermediate spaced portions slidably mounted on the stem tube, hollow material contacting elements rigidly secured to the pad means in fluid tight relationship thereto to bridge the gaps between said spaced portions with the interior of said contacting elements in fluid communication with the interior of the stem tube.

---

This invention relates to rotary material processors such as hollow flight screw conveyor devices as described and shown in U.S. Pat. 2,731,241 wherein hollow helical members, rotatably mounted within a suitable trough, transfer material from an inlet portion to an outlet portion of the trough while heating or cooling material by heat exchange with a heat transfer medium conducted through the hollow flight, which devices are well known in the art of material processing.

This invention also relates to other material processors such as rotary heat exchangers or mixers which do not necessarily convey material.

Such devices have served the purpose for which they are designed but have not been entirely satisfactory for the following reasons:

Hollow flights welded directly to the stem pipe set up welding stresses in the pipe and flights which, under the usual conditions of operation wherein a large temperature difference exists between the interiors of the flights and stem pipe and the exteriors thereof, result in stress concentration and temperature induced cracking as well as failures due to mechanical stresses imposed by material loading;

With the hollow flights mounted on a separate ribbon pad and welded thereto with the ribbon pad in turn welded to the stem pipe the same tendency to temperature induced cracking of the stem pipe and/or the hollow flights is observed; and With ribbon pads welded only at widely separated points to the stem pipe the temperature induced cracking and mechanical stress failures are probably reduced but the material being processed can work in between the ribbon pad and the stem pipe making cleaning difficult especially where decomposition products must be removed, or where it is desired to use the processor for different materials at different times.

These and other difficulties inherent in the prior art hollow flight screw processors and heat exchangers are minimized or completely overcome by the hollow flight screw processor of this invention wherein a stem pipe is provided with a helical ribbon pad spirally wound on the stem pipe with spaces between successive turns of the spiral ribbon and the hollow flights are positioned over the spaces between the successive turns and each portion of hollow flight is welded to two different turns of the ribbon pad as hereinafter more fully described. With this construction of a hollow flight conveyor screw the stress concentration and thermally induced cracking are almost entirely eliminated and no added cleaning problems have been introduced since the ribbon pad and hollow flight form a completely closed vessel with no possibility of contamination through materials lodging therebetween.

These and other advantages of the hollow flight conveyor of this invention will be more apparent upon consideration of the following description and drawings in which:

FIG. 1 is a top plan view of a hollow flighted conveyor constructed according to the principles of this invention;

FIG. 2 is a fragmentary partially sectional view taken substantially on line 2—2 of FIG. 1 looking in the direction indicated by the arrows;

FIG. 3 is a fragmentary view of a portion of a stem tube ribbon pad combination constructed according to the principles of this invention; and FIG. 4 is a fragmentary sectional view taken substantially on line 4—4 of FIG. 2.

In FIG. 1 there is shown a rotary heat exchanger or material processor generally indicated at 10, of a type well known in the art comprising a generally rectangular housing 12 having suitably mounted therein for relative counter rotation a pair of hollow flight conveyor screws 14 and 16, upper and lower respectively as viewed in FIG. 1 and being respectively right hand and left hand flighted for counter rotation in overlapping relationship to convey material from right to left as viewed in FIG. 1 from an inlet opening 18 to an outlet opening 20 in a manner well known in the art.

The principles of this invention are particularly exemplified in the conveyor screws 14 and 16 but since the two screws are identical in all respects except for the right and left handedness of the respective screw elements only the right handed conveyor screw 14 will be described in detail (see FIGS. 2, 3 and 4).

As applied in this application the term "helical" will be used in its primary dictionary meaning as, "having the form of a helix: cylindrically spiral," e.g. the shape of a coil formed by winding a wire around a uniform tube. It is to be noted, however, that a variation in the pitch of the helix is included within this definition and contemplated in this invention.

FIG. 3 shows a subassembly stage in the production of the conveyor screw 14 wherein a suitable length of pipe or tubing hereinafter the stem pipe 22 is welded to a disc like end plate 24 having a central reduced diameter portion 26 extending outwardly therefrom to provide for journaling the conveyor screw 14 for rotation about the longitudinal axis thereof. Wrapped about the end portion of the outer surface of the stem pipe 22 adjacent the end plate 24 is a semi-helical full pad element 28 completely encircling the stem pipe 22 adjacent the end plate 24 with a circular edge spaced from and parallel to the outer edge of the end plate 24 with continuous seam welding therebetween to provide a fluid tight connection bgteween the end of the stem pipe and the circular end of the full pad element 28. The full pad element 28 is thus in the form of a cylinder with a seam along the ends of the peripheral surface mated together and welded in fluid tight relationship as at the line 29 forming an element of a cylinder originally split along this line. The left hand axial end of the full pad element 28 as viewed in FIG. 3 is helical in form progressing to the left as the left hand edge 30 is followed from the seam 29 around the cylindrical surface of the full pad element 28 and back to the seam line 29 as seen in FIG. 3 with the axial distance from the beginning of the edge 30 to the end of the edge 30 equal to the desired screw pitch for the conveyor screw 14 as hereinafter made clear. Welded to the leftwardly extending portion of the seam line 29 is the helical pad element 32 which is a long strip of relatively thin material wound spirally around the stem pipe 22 from the full pad anchor element 28 at the right hand end to a similar left hand full pad anchor element (not shown) at the other end of the stem pipe 22 with the helical pad element 32 being welded only to the full pad element at each end of the stem pipe 22. It is to be noted that the successive turns of the helical pad element 32 are spaced from each other a substantial distance and that this spacing is continued clear to the ends of the helical pad element 32 where it is welded to the full pad element 28 and that aligned with such space 34 and circumferentially spaced therefrom a bore 36 extends through the full pad element 28 the stem pipe 22 and the journal member 26 as best seen in FIG. 4.

As in readily apparent in FIGS. 1 and 2 the conveyor screw 14 is provided on its outer surface with a hollow helical element 40 of a type well known in the conveyor art being made up of a radially extending spiral face flight 42 and an outwardly extending forwardly cupped back flight 44 with the radially inner edges of the two flight substantially separated and fastened to the pad element 32 on opposite sides of the space between successive turns of the pad element 32 along lines parallel to the edges of the space 34 as such as those lines indicated by dashed lines 42′ and 44′ in FIG. 3 along which lines 42′ and 44′ the face flight 42 and the back flight 44 are welded, respectively, and at the same time the radially outer edges of the flight 42 and 44 are welded together in a continuous seam in a well known manner.

It will thus be seen that the interior 45 of the helical element 40 between the face flights 42 and the back flights 44 forms a continuous passageway from a suitable supply pipe and manifold 50 (see FIG. 1) suitably connected to a source of fluid heat exchange medium with the supply pipe 50 connected through a suitable fluid conducting rotary joint 52 to a hollow tubular journal member 27 on the left hand end of the conveyor screw 14 ts best seen in FIGS. 2 and 4. The interior of the journal element 27 communicates, by way of a bore 37 through the journal member 27 and the stem pipe 22, with the space 45 inside the helical element 40 hereinabove described. The continuous space 45 inside the helical element 40 communicates at its other end, through the earlier described bore 36, with the interior of the journal member 26 at the right hand end of the screw 14 which element 26 blocked off by a solid plug 25 and communicates with the interior of the stem pipe 22 through a hollow plug 33. The interior of the stem pipe 22 communicates through a siphon tube 46, mounted within the journal member 27, and the rotary joint 52 to make connection with an outlet manifold and pipe 54 which suitably communicates with a source of heat or other heat exchange means to provide for reconditioning the heat exchange fluid or disposition thereof as required in a well known manner.

The operation of the processor 10 of this invention is entirely the same as that described for the devices shown and illustrated in the above cited U.S. patent and description of such operation in considered unnecessary.

It is to be noted, however, that the use of high temperature liquid or gaseous heat exchange fluid within the helical element 40 causes differential thermal expansion of the various parts of the screw 14 but that the differential expansion is of little or no effect on the screw 14 because the relatively heavy walled stem pipe 22 is free to expand and contract within reasonable limits independently of the spiral flight 40 and the helical pad 32 since only at the ends of the helical pad 32 is there any rigid connection between the flight 40 and the stem pipe 22. Thus, if the flight 40 together with the helical pad element 32 are subjected to high temperature and should expand more than the stem pipe 22 all that would happen would be a slight loosening of the pad 32 on the stem pipe 22 and since the pad 32 and the front flights 42 and back flight 44 form a complete fluid containing vessel any looseness of the helical element 32 on the otuer surface of the stem pipe 22 is without deleterious effect and no leakage path is developed by this loosening. It is also to be noted that the thin material of the pad 32 precludes the setting up of stresses in the welded seams of a great enough magnitude to cause the formation of cracks as noted in hollow flights conveyor screws of the prior art.

It is further to be realized that the above description of a particular structure applying the principles of this invention is not to be taken as limitative but only as exemplary of the preferred way of applying the principles of this invention for its use with liquid heat exchange element. Particularly it should be pointed out that in the case of using steam or other vaporized heat exchange medium the hollow flight screws would be sectionalized and provided with dip legs and condensate drain means in a manner well known in the art and illustrated in the above cited U.S. patent. The use of vaporous materials with somewhat different fluid connections is not to be taken as a different concept but simply another way of applying the principles of this invention embodied in the use of a relatively thin helical pad element fastened only at its end portions to the stem pipe about which it is installed and in the use of hollow flight elements bridging over the gaps between successive turns of the helical pad element to apply the principles of this invention.

It is further to be understood that the pinch of the helical elements could be of any desired value, including zero pitch. At zero pitch the helical pad would become a series of spaced tubular collars joined together by hollow bridging toroidal flight elements extending across the gaps between the collars and having hollow interiors connected to provide for circulation of heat exchange medium therein.

Another envisioned variation includes the utilization of the principles of this invention in conjunction with those of copending application of William E. Archer, Ser. No. 728,255 filed May 10, 1968 entitled Screw Type Material Processor, which application is assigned to the same assignee as is this invention. In that application the hollow conveyor flights are made up in discrete screw segments of approximately one turn each with gaps between the segments. With such segments mounted on the helical pad element 32 of this invention it would be necessary to add bridging elements to extend between the proximate ends of the flight segments and cover the space 34 between the successive turns of the helical pad 32 in fluid tight relationship to both the flight segments and the pad element.

This invention having hereinabove been described in a preferred embodiment it is to be realized that other details of construction may be used in applying the principles of this invention. It is therefor respectfully requested that this invention be interpreted as broadly as possible limited only by the claims appended hereto.

What is claimed is:

1. A rotary material processor comprising: an elongated stem tube rotatably supported within an elongated housing, helical pad means encompassing an elongated portion of said stem tube with axially immediately adjacent portions thereof being spaced longitudinally along the entire length of said stem tube and with end portions of said pad means being rigidly secured to said stem tube, hollow material contacting means secured to said pad means in fluid tight relationship therewith along the entire extent of the spaces between said adjacent portions of said pad means, and passageway means in spaced portions of said tube means communicating between the interior of said stem tube and the interior of said material contacting means.

2. A rotary material processor as specified in claim 1 wherein said contacting element is continuous and said pad means is continuous and forms a continuous helical gap along a major portion of the length of the outer surface of said stem tube said gap being bridged over by said element.

3. A rotary material processor as specified in claim 2 wherein said helical contacting means is a plurality of interengaging hollow screw conveyor flights with a respective stem tube and helical pad for each flight.

4. A rotary material processor as specified in claim 2 wherein said helical contacting element is at least one hollow flight for a screw conveyor and said helical pad means has end portions completely encircling said stem tube to seal the end of said gap.

5. A rotary material processor as specified in claim 4 wherein said at least one flight is a plurality of right hand and left hand flights rotatably mounted in interengaging pairs.

6. A hollow rotatable material processor element comprising: an elongated stem pipe; helical pad means having spaced portions mounted upon the other surface of said stem pipe from one end portion to the other end portion of said pipe; anchor means rigidly secured to end portions of said pad means and to said stem pipe end portions in fluid tight relationship thereto, hollow helical flight means secured in fluid tight relationship to said pad means bridging the spaces between successive portions of said pad means and also secured in fluid tight relationship to said anchor means at both ends of said stem pipe.

7. A processor element as specified in claim 6 wherein said element is a screw conveyor flight.

8. A processor element as specified in claim 7 wherein said pad means is a helical strip wound on the surface of said stem pipe.

9. A processor element as specified in claim 8 wherein said spaces form a continuous helical gap from one of said stem tube end portions to the other end portion thereof.

10. A processor element as specified in claim 9 wherein the interiors of said hollow flight means and said stem pipe are in fluid communication.

References Cited

UNITED STATES PATENTS

| 790,466 | 5/1905 | Valerius | 165—87 |
| 3,056,588 | 10/1962 | Alexandrovsky | 165—87 |

MEYER PERLIN, Primary Examiner

U.S. Cl. X.R.

165—92